United States Patent [19]

Eden et al.

[11] Patent Number: 4,874,628

[45] Date of Patent: Oct. 17, 1989

[54] PROCESS FOR THE MANUFACTURE OF CAST JELLY GUM CONFECTIONARIES

[75] Inventors: James L. Eden, East Millstone; James J. Kasica, Somerville; James P. Zallie, Bound Brook, all of N.J.

[73] Assignee: National Starch and Chemical Corporation, Bridgewater, N.J.

[21] Appl. No.: 242,852

[22] Filed: Sep. 12, 1988

[51] Int. Cl.$^4$ .............................................. A23G 6/00
[52] U.S. Cl. .................................... 426/578; 426/660; 426/661
[58] Field of Search .................. 127/32; 426/578, 660, 426/661

[56] References Cited

U.S. PATENT DOCUMENTS

| | | | |
|---|---|---|---|
| 3,086,890 | 4/1963 | Sarko et al. | 127/69 |
| 3,218,177 | 12/1965 | Robinson et al. | 426/578 |
| 3,446,628 | 5/1969 | Schoch et al. | 127/32 |
| 4,225,627 | 9/1980 | Moore | 426/548 |
| 4,280,851 | 7/1981 | Pitchon et al. | 127/33 |
| 4,726,957 | 2/1988 | Lacourse et al. | 426/578 |
| 4,769,081 | 9/1988 | Maher | 127/33 |

Primary Examiner—Donald E. Czaja
Assistant Examiner—Evan Federman
Attorney, Agent, or Firm—Margaret B. Kelley; Edwin M. Szala

[57] ABSTRACT

Pregelatinized high amylose starches are useful in processing cast jelly gum confectionaries. The starch has an amylose content of at least 40% and it may be used alone or in combination with a converted starch. The starch is pregelatinized by spray-drying using a novel continuous coupled jet-cooking/sray-drying process or simultaneous atomization/spray-drying process or by drum-drying after fully dispersing the starch. The confectionary can be cooked at a lower temperature than was possible using prior art starches and still provide confectionaries with desirable characteristics.

19 Claims, No Drawings 4,874,628

PROCESS FOR THE MANUFACTURE OF CAST JELLY GUM CONFECTIONARIES

BACKGROUND OF THE INVENTION

This present invention relates to the manufacture of jelly gum confectionaries by casting, more particularly to a process for preparing cast confectionaries utilizing unique high amylose starches and to the confectionaries thus produced.

Jelly gum confectionaries, which typically include familiar candies such as gum drops, gum slices, fruit gums (imitation fruit pieces), and jelly beans, are characteristically resilient, relatively rigid, and have a short texture. While many compositions have been employed in the preparation of such confections, the most typical composition comprises an aqueous dispersion of various sweeteners and a gelling starch component. The aqueous dispersions are typically cast, i.e., deposited hot into molds to set to shape. In this casting system, referred to in the trade as the Mogul system, the ingredients, including a thin boiling starch or a combination of a high amylose starch and a thin boiling starch, are cooked at a moisture above the final moisture of the confectionary, and deposited as a thin, hot liquid into a mold generally formed of dry starch. The starch in the mold forms the confectionary pieces and serves to reduce the moisture content of the confectionary pieces to the level of the end product. Typically, the cooked moisture level is about 15–50% in commercial continuous pressure cooking and batch (e.g., kettle) cooking systems; the final moisture content is about 12–21%.

The aqueous dispersions preferably have thin hot viscosities and upon cooling set to provide firm gel structures. The hot flow viscosity of the dispersion should be thin to afford easy handling during deposition. If the dispersion is too thick, misshaped candies may result due to non-uniform amounts of gum being deposited. Undesirable tailing may also occur which is a result of the inability of the thick dispersion to form a clean break after deposition into one mold prior to deposition into a subsequent mold. The threads connecting the gum pieces represent a loss to the finished goods yield.

Fluidity corn starches have been advantageously employed in jelly gum confectionaries due to the thinner hot paste viscosities they exhibit. Accordingly, larger quantities of fluidity corn starch may be employed in comparison to unconverted (i.e., nondegraded native) starch in order to give pastes of comparable hot flow viscosity. When these hot pastes are cooled, it has been shown that the gel strength of the fluidity starch paste is considerably greater than the gel strength of the unmodified starch paste. See Chemistry and Industry of Starch, 2nd Edition, R. W. Kerr, Academic Press Inc., New York (1950), pgs. 559–562 for a discussion regarding jelly gum confections and their properties.

Various patents have taught the manufacture of jelly gum concessionaires by casting. They include the following:

U.S. Pat. No. 3,218,177 (issued Nov. 16, 1965 to J. Robinson et al.) describes jelly starch base candies which employ from about 5–10%, based on dry substance weight, of a starch or starch mixture having an amylose to amylopectin ratio in the range of 75:25 to 40:60. The starch portion is gelatinized at from about 135° C. (275° F.) to temperatures not in excess of those at which the starch degrades. When starch mixtures containing more than 75% amylose are used, the candy is of poor texture and quality. When the starch mixtures contain less than 40% amylose, the properties of the candy are similar to those made by conventional methods using a thin confectioner's cooking starch.

U.S. Pat. No. 3,446,628 (issued May 27, 1969 to T. Schoch et al.) describes a starch-based jelly gum confection which employs as a congealing agent a thin-boiling cereal starch having an amylose content not in excess of 35% and a fat content not in excess of 0.3%..

U.S. Pat. No. 4,225,627 (issued Sept. 30, 1980 to C. Moore) describes a method for demolding confectionary products, especially high amylose candies such as jelly gums, fondant creams, and the like which contain a high amylose starch as the congealing agent. The liquid confections are deposited into molds, allowed to set, and thereafter expelled from the molds by steam pressure. The high amylose starches suggested for use therein contain at least 35% amylose and are preferably hydrolyzed.

U.S. Pat. No. 4,726,957 (issued Feb. 23, 1987 to N. L. Lacourse et al.) describes a jelly gum confection based on a starch blend comprising (a) from 25–99% of an acid- or enzyme-converted high amylose starch having an amylose content of 65–80% and a calcium chloride viscosity of about 16–200 seconds and (b) from 1–75% of a starch having an amylose content of at least 25% which may be an unconverted starch and/or converted starch other than the acid- or enzyme-converted high amylose starch. This confection is characterized by its desirably low hot flow viscosity (20 seconds) and high gel strength (at least 14 g cm$^2$, at 74–84% solids).

While most jelly gum confectionaries use high amylose starch (about 30–60 parts) to obtain candies that will set to a firm enough gel for further processing in 24 hours or less, it is necessary to cook these starches at about 168° C. (335° F.) in superatmospheric cookers, such as jet cookers, to obtain the gelling properties. The use of such high temperatures strains the capabilities of most jet cookers and is not energy efficient.

Accordingly, there is need for an improved process for preparing starch-based, quick setting jelly gum confectionaries which can be cooked at temperatures as low as 124°–141° C. (256°–285° F.) in a continuous cooker under pressure or even under atmospheric cooking conditions, e.g. in a kettle.

SUMMARY OF THE INVENTION

The present invention provides an improved process for the manufacture of a jelly gum confectionary by casting, which comprises the steps of:

(a) preparing a dispersion of about 1 to 15%, on a dry solids basis, of a pregelatinized unconverted and/or converted high amylose starch (at least about 40% amylose) alone or in combination with up to about 9 parts of a converted starch other than a high amylose starch, about 80 to 95% of a sweetener, and sufficient water (about 5–50%), the percentages being by weight and totaling 100%; wherein the pregelatinized unconverted and/or converted high amylose starch comprises (i) a spray-dried, uniformly gelatinized granular starch in the form of indented spheres, with at least a majority of the granules being whole and unbroken, the starch granules being in the form of loosely-bound agglomerates or individual granules, (ii) a spray-dried, non-granular starch, characterized in that the starch is substantially non-crystalline, substantially non-retrograded, and fully pre-dispersed (iii) a drum-dried, fully dispersed, non-granular starch which is a fluffy powder, or (iv) mixtures thereof;

(b) cooking the dispersion at at least about 71° C. (160° F.) for a time sufficient to fully solubilize the starch or starches;

(c) reducing the solids, if necessary, to about 72–82% soluble solids by cooking at the boiling point of the dispersion; and (d) casting the cooked dispersion.

The dispersion may also contain 0 to about 20% of a confectionary ingredient selected from the group consisting of a flavorant, colorant, fat, oil, surfactant, humectant, vitamin, preservative and mixtures thereof. The amount of water which is sufficient will vary depending upon the optional ingredients selected, for example with a fruit puree it may not be necessary to add as much water. The cooked dispersion is typically cast into a jelly gum confectionary mold.

The process can be carried out continuously in an indirect steam cooker or static cooker at 121° C. (250° F.) or more. It can also be carried out as a batch process, e.g., in a kettle, in which case cooking will be continued until the solids are increased to about 72–82%.

The cast jelly gum confectionaries prepared by this improved process should have stronger gels, improved clarity, and improved textures when they contain the spray-dried, fully dispersed, non-granular starch since this starch, in contrast to high amylose starches used in standard systems at this temperature, will be completely and thoroughly dispersed in the confectionary formulation.

DESCRIPTION OF THE PREFERRED EMBODIMENTS

Cast jelly gum confectionaries do not include hard candy; neither do they include gels with flowable characteristics. The end confectionary products are of three basic types which vary primarily in gel texture and coating procedure.

The jelly gum confectionary may be moistened with steam and rolled in granulated sugar to produce the classic gum drop, orange slice, or similar pieces ("sugared jellies"). The gels in these confections are firm and have ample resiliency for shape retention when marketed in stacked bags or in bulk. However, the eating qualities of the gel are desirably a soft tender bite with moderately quick dissolution when chewed. A second type of gel confection is jubes or hard gums produced from the same primary gel ingredients as sugared jellies, but dried to a lower moisture content and generally containing additional starch. The surface is coated with an edible oil, rather than granulated sugar. By intent, the finished confection is much firmer in gel strength and longer lasting when chewed than sugared jellies. A third type of gel confection is jelly beans having jelly centers which are resilient and firm enough for tumbling in a revolving pan for coating with a sugar shell. All of these confections have in common a firm, resilient gel structure.

Since the gel confections of the invention will be cast, the ingredients making up the confections will be mixed together in the proportions which will provide the desired texture when dried to the final moisture content of a finished confectionary. The ingredients will include the pregelatinized high amylose starches, to be described hereinafter, at a level of between about 1 and about 15%, on a dry solids basis, preferably between 1.5 and 10%; sweeteners at a level of between about 80 and 95%, preferably between about 85 and 93% on a dry solids basis, water at a level of between about 5 and 50%, and optional confectionary ingredients in an amount of up to about 20%, on a dry solids basis.

The use of particular, pregelatinized granular or non-granular converted and/or unconverted high amylose starches is a significant feature of the invention. The converted or unconverted starches are cooked and spray-dried or drum-dried under conditions which provide pregelatinized unconverted and/or converted high amylose starches with unique properties. It may also be possible to use stabilized, unconverted and/or converted high amylose starches (i.e., derivatized starches such as ethers or esters and/or the crosslinked products) thereof as the main component provided the gel strength of the confectionary is not adversely affected. The applicable starch base which may be employed may be derived from any high amylose plant source which contains concentrations of about 40–100% amylose, including, for example, high amylose corn and wrinkled pea. The preferred starches are those derived from high amylose corn hybrids.

A method for preparing suitable spray-dried, granular pregelatinized starches is described in U.S. Pat. No. 4,280,851 (issued July 28, 1981 to E. Pitchon et al.). In this process a mixture of the granular starch is cooked or gelatinized in an atomized state. The starch which is to be cooked is injected through an atomization aperture in a nozzle assembly to form a relatively finely-divided spray. A heating medium is also injected through an aperture in the nozzle assembly into the spray of atomized material so as to heat the starch to a temperature effective to gelatinize the starch. An enclosed chamber surrounds the atomization and heating medium injection apertures and defines a vent aperture positioned to enable the heated spray of starch to exit the chamber. The arrangement is such that the lapsed time between passage of the spray of starch through the chamber, i.e., from the atomization aperture and through the vent aperture defines the gelatinization time of the starch. The resulting spray-dried pregelatinized starch comprises uniformly gelatinized starch granules in the form of indented spheres, with a majority of the granules being whole and unbroken and swelling upon rehydration. Nozzles suitable for use in the preparation of these starches are also described in U.S. Pat. No. 4,610,760 (issued Sept. 9, 1986 to P. A. Kirkpatrick et al.)

A method for preparing suitable drum-dried, non-granular pregelatinized starches is described in U.S. Pat. No. 3,086,890 (issued Apr.23, 1963 to A. Sarko et al.). The starch slurry is heated to a temperature from just above boiling to 191° C. (375° F.) and a pressure of about 5 to 140 psi for 1–60 minutes. It is then drum-dried at 110°–200° C. (230°–392° F.) for 40–75 seconds and the resulting sheet is pulverized. The resulting non-granular starch is obtained as a dry, porous, white fluffy powder.

Spray-dried, pregelatinized, non-granular, converted or unconverted high amylose starches with suitable properties can be provided by a novel continuous coupled jet-cooking/spray-drying process. The process comprises the steps of:

(a) forming a slurry or a paste comprising the converted or unconverted high amylose starch and water;

(b) jet-cooking the aqueous slurry or paste of the starch with steam at a temperature sufficient to fully disperse or solubilize the starch;

(c) immediately conveying and introducing under high temperature and pressure the jet-cooked dispersion or solution into a nozzle of a spray-dryer chamber;

(d) atomizing the jet-cooked dispersion or solution through the nozzle of the spray-dryer;

(e) drying the atomized mist of the jet-cooked starch within the spray-dryer chamber; and (f) recovering the jet-cooked and spray-dried starch as a water-dispersible or water-soluble powder.

The cooking temperature will depend upon whether a converted or unconverted starch is used. Typical temperatures are about 138°–177° C. (280°–350° F.).

The cooking chamber pressure used in the continuous coupled process is low, typically 20 to 130 psig, and is the saturation pressure of steam at the temperature used plus the small incremental pressure needed to move the dispersion through the chamber. Cooking chamber pressures suitable for high amylose starches are 80 to 150 psig, most preferably 100 to 130 psig for a starch having an amylose content of about 70%.

An essential step in the above process is the conveying of the thoroughly cooked, substantially fully dispersed starch, under elevated pressure and temperature, to the spray-dryer atomization nozzle. In the preferred method, a low shear pneumatic nozzle is used, and the transfer is carried out at substantially the same temperature and pressure used in the jet-cooking. The transfer is carried out without any venting to the atmosphere. Atomization in a pneumatic nozzle may be used. The pressure of the atomization gas (steam or air) used must be sufficient for proper atomization into small droplets to allow rapid drying to an appropriate moisture without retrogradation.

Use of a pressure nozzle in the above process requires insertion of a high pressure pump (2,000 to 10,000 psig) between the jet-cooker and atomization nozzle. The temperature after passage through the high pressure pump should be maintained substantially equivalent to the jet-cooking chamber temperature. The pressure after the high pressure pump must be sufficient to properly atomize the cook to allow rapid drying to an appropriate moisture without retrogradation.

These nozzles are described in detail on page 16f in *Spray-Drying: An Introduction to Principles, Operational Practice and Applications* by K. Masters (Leonard Hill Books, London 1972).

The spray-dried starch produced by the above process is non-granular and is characterized in that it is substantially non-crystalline and substantially non-retrograded.

These pregelatinized granular and non-granular converted and/or unconverted high amylose starches can be used alone or in combination with converted starches other than high amylose starches (e.g., fluidity corn or sago starches). When a second component is present, the unconverted or lightly converted high amylose starch must be present in an amount sufficient to provide a firm gel at the cooking temperature used. Typically, the pregelatinized unconverted or lightly converted high amylose starch is present in an amount of at least about 10 to 50%, preferably to 20–40%, by weight on a dry solids basis in the blend.

Converted starches, commonly referred to as fluidity or thin-boiling starches, are starches whose molecular weight has been reduced by mild acid hydrolysis or enzyme conversion. Acid conversion is preferred due to the ease in handling and recovery afforded by a granular starch as opposed to starch in dispersed form as necessitated by enzyme conversion.

In the preparation of the converted starches by acid conversion, the granular starch base is hydrolyzed to the desired degree in the presence of an acid, such as sulfuric or hydrochloric acid, at a temperature below the gelatinization temperature of the starch. The starch is slurried in water, and the acid (usually in concentrated form) is then added. Typically, the reaction takes place over an 8–16 hour period, after which the acid is neutralized with alkali (e.g., to pH of 5.5), and the starch is recovered by filtration.

In preparation of the converted starches by enzyme treatment, the granular starch base is slurried in water and the pH is adjusted to about 5–7 with alkali or acid. A small amount of alpha amylose enzyme (e.g., about 0.02% on the starch) is added to the slurry which is then heated to or above the gelatinization temperature of the starch. When the desired conversion is reached, the pH is adjusted with acid (e.g., to below about 4) to deactivate the enzyme and the dispersion is held at that pH for a period of at least 10 minutes. Thereafter the pH may be readjusted. The resulting converted starch dispersion is usually cooked to ensure complete solubilization of the starch.

It should be appreciated that the degree of conversion, as indicated by the water fluidity, is affected by the amount of acid or enzyme used as well as the time and temperature. The conversion conditions should be adjusted to provide an appropriate water fluidity.

When a combination of starches is used in the confectionary formulation, the starches can be used as a one-part system, i.e., they may be pregelatinized by cooking both starches at the same time and then spray-drying or drum-drying the resulting starch cook. They can also be used as a two-part system in which case the unconverted or lightly converted high amylose starch is pregelatinized and added to the confectionary formulation, and the second starch component (typically a fluidity corn starch) is blended with the pregelatinized starch or separately added to the confectionary formulation without prior cooking.

The converted starches preferred for use in combination with the pregelatinized high amylose starches are prepared from starch bases other than high amylose starches, such as corn, potato, sweet potato, rice, sago, tapioca, waxy maize, sorghum, or the like. Flours may also be used as a starch source.

The converted starches referred to as thin-boiling confectioner's cooking starches, which include acid-hydrolyzed or oxidized corn, sorghum, and wheat starches having amylose contents of about 25–35% amylose, are preferably employed in the blend, with the acid-hydrolyzed corn starch being most preferred.

The above conversion procedures are conventional and well-known to those skilled in the art and described in such publications as "Handbook of Water-Soluble Gums and Resins", Robert L. Davidson (Editor), Chapter 22: Starch and Its Modifications by M. W. Rutenberg, McGraw Hill Book Co. (New York) 1980.

The sweetener component of the confectionary formulation may include a wide array of sweeteners and sweetening agents traditionally employed in jelly gum manufacture. Typical sweetening compositions include, for example, combinations of sucrose, dextrose, fructose, high fructose corn syrup, corn syrup, hydrogenated corn syrup, corn syrup solids, invert syrup and maltodextrins. In general, these sweeteners include all commonly used mono- and disaccharides. Low to no calorie sweeteners, e.g., aspartame, saccharine, and the like may also be employed.

The jelly gum confectionaries herein may also advantageously contain various other optional confectionary ingredients including, for example, natural flavorants (preferably fruit) and artificial flavorants, coloring agents, fats, oils, surfactants, humectants, vitamins, and preservatives.

The natural fruit flavorants useful in the present composition may include fruit purees and fruit puree concentrates which have a high moisture content. One may also advantageously employ dehydrated fruit solids in the preparation of the gum confections. The dehydrated solids may consist entirely of fruit. Preferred are the dried fruit solids prepared according to the procedure described in U.S. Pat. No. 3,940,505 (issued Feb. 24, 1976 to Bernard H. Nappen et al.) which are dried in the presence of a suitable amount of a granular or pregelatinized starch. The disclosure of U.S. Pat. No. 3,940,505 is incorporated herein by reference.

It will be recognized by those skilled in art, that, in addition to the amount of starch employed in the formulation, the amount and composition of any optional confectionary ingredients employed will have an effect on the ultimate gel strength of the confection.

The jelly gum confectionaries herein typically comprise, on a dry substance basis, from about 5-15% of the pregelatinized high amylose starch or its blend with a fluidity starch, about 70-95% sweetener solids, and about 0-20% of one or more of the confectionary ingredients described above.

The methods of preparation of the jelly gum confections may be achieved by any conventional means, including kettle cooking since the temperature required can be achieved at atmospheric pressure.

An indirect steam cooker can be used. An example of such a cooker is the the TBSC cooker available from TER BRAAK BV Holland. It is used to cook colloidal based confectionary products. This is accomplished by having candy slurry pass through a long copper or stainless steel coil housed in pressurized steam chamber. This allows for the product to be exposed to a large heat exchange surface, while being spontaneously held under pressure by the mass in the element itself. The residence time within this heating coil can range from 20-60 seconds. Since the cooker functions as an evaporative cooker, confectionary slurries are typically premixed at lower solids than typical confectionary premixes for jet-cooking. The amount of moisture that is evaporated at flash-off is related to the processing temperature. The higher the processing temperature the more moisture that will be evaporated. As an example of the amount of moisture that is evaporated, a high amylose starch containing formulation processed at 160° C. through the TBSC will lose approximately 6-7% moisture at flash-off. A typical rule regarding moisture loss is 1% moisture loss for every 10° C. increment in cook temperature above 100° C. Having the ability to flash moisture off and formulate with higher levels of water in the premix is especially desirable. The extra amount of water contained in the premix to be cooked allows for complete solubilization and yields a low slurry viscosity. After cooking, the product can be deposited at high solids, reducing the drying time to a minimum. This can be a desirable advantage over the jet-cooking of the confectionaries.

Typically, a two stage preparation technique is employed. In one process, the pregelatinized starch or starch combination and a portion or all of the sweetener are homogeneously dissolved in a suitable amount of water, at a temperature of about 100° C. and the mixture is cooked in the presence of a major portion or all of the sweetener component for an amount of time sufficient to gelatinize any starch which has not been pregelatinized. The total amount of water necessary for dissolution will typically range from about 10-30% of the total confectionary formulation. In the second stage of preparation, any remaining sweetener as well as all additional confectionary ingredients employed are added to the dispersed confectionary slurry. Prior to casting, the confectionary syrup is concentrated, if desired, to a concentration preferably ranging between 74-84% solids.

In examples which follow all parts and percentages are given by weight and all temperatures are in degrees Celsius, unless otherwise noted. The amylose content of the starches exemplified are only approximate percentages as values are only reliable within about 4% range.

The following test procedures were used:

Water Fluidity Measurement

This test is described in U.S. Pat. No. 4,207,355 issued June 10, 1980 to C. W. Chiu et. al.

The water fluidity of converted starch is measured by using a Thomas Rotation Shear-Type Viscometer (manufactured by Arthur H. Thomas Co., Philadelphia, Pa. 19106), standardized at 30° C. with a standard oil having a viscosity of 24.73 cps., which oil requires 23.12±0.05 sec. for 100 revolutions. As conversion of the starch increases, the viscosity of the starch decreases and water fluidity values increase. Accurate and reproducible measurements of the water fluidity are obtained by determining the time which elapses for 100 revolutions at different solids levels depending on the degree of conversion of the starch. The general procedure is as follows: The required amount of starch (e.g., 6.16 g. dry basis) is slurried in 100 ml. of distilled water in a covered copper cup, and the slurry heated in a boiling water bath for 30 min. with occasional stirring. Then, the starch solution is brought to the final weight (e.g., 107 g.) with distilled water. The time required for 100 revolutions of the resultant solution at 81°-83° C. is recorded and converted to a water fluidity number as defined in the table below:

| Amount of Starch Used (anhydrous, g.): | | | | |
|---|---|---|---|---|
| 6.16[a] | 8.80[b] | 11.44[c] | 13.20[d] | |
| Time required for 100 Revolutions (sec.) | | | | Water Fluidity |
| 39.6 | | | | 10 |
| 29.3 | | | | 15 |
| 22.6 | | | | 20 |
| 20.2 | | | | 25 |
| | 33.4 | | | 30 |
| | 27.4 | | | 35 |
| | 22.5 | | | 40 |
| | | 32.5 | | 45 |
| | | 26.8 | | 50 |
| | | 22.0 | | 55 |
| | | | 24.2 | 60 |
| | | | 19.2 | 65 |
| | | | 15.9 | 70 |
| | | | 13.6 | 75 |

| Amount of Starch Used (anhydrous, g.): | | | | | |
|---|---|---|---|---|---|
| 6.16[a] | 8.80[b] | 11.44[c] | 13.20[d] | | |
| Time required for 100 Revolutions (sec.) | | | | | Water Fluidity |
| | | 11.5 | | | 80 |
| | | | 10.1 | | 85 |

[a] Final weight of starch solution = 107 g.
[b] Final weight of starch solution = 110 g.
[c] Final weight of starch solution = 113 g.
[d] Final weight of starch solution = 115 g.

Calcium Chloride Viscosity (7.2% Solids Test)

The calcium chloride viscosity of the converted high amylose starch is measured using a Thomas Rotation Shear-Type Viscometer standardized at 30° C., with a standard oil having a viscosity of 24.73 cps, which oil requires 23.12±0.05 seconds for 100 revolutions. As the conversion of the starch increases, the viscosity of the starch decreases and the $CaCl_2$ viscosity values decrease. Accurate and reproducible measurements of the calcium chloride viscosity are obtained by determining the time which elapses for 100 revolutions at a specific solids level. The general procedure is as follows: A total of 7.2 grams of the converted starch (anhydrous basis) is slurried in 100 grams of buffered 20% calcium chloride solution in a covered stainless steel cup, the slurry heated in a boiling water bath for 30 minutes with occasional stirring. Then, the starch solution is brought to the final weight (107.2 grams) with hot distilled water. The time required for 100 revolutions of the resultant solution at 81°–83° C. is measured three times in rapid succession and the average of the three measurements recorded.

The calcium chloride solution is prepared as follows: A total of 264.8 grams of reagent grade calcium chloride dihydrate is dissolved in 650 ml. of distilled water in a tared 1 liter glass beaker. Thereafter 7.2 grams of anhydrous sodium acetate is dissolved in the solution. The solution is allowed to cool and the pH is measured. If necessary, the solution is adjusted with hydrochloric acid to pH 5.6±0.1. Finally, the solution is brought to weight (1007.2 grams) with distilled water.

Gel Strength

The gel strength of the jelly gum confectionaries is measured with a Stevens LFRA Texture Analyzer employing a cylindrical ball probe #7 run at a speed of 0.5 mm./sec. The force (in grams per square centimeter) required to penetrate the confection a distance of 4 mm. with the probe is measured three times and the average of the three measurements is recorded.

EXAMPLE I

This example shows the use of a 30/70 blend of the unique spray-dried, pregelatinized, non-granular, unconverted and converted high amylose starches (about 70% amylose) prepared by the novel coupled jet-cooking and spray-drying process with a fluidity corn starch (65 WF) to prepare a jelly gum confectionary at two jet-cooking temperatures. It also shows the gel strength of the non-pregelatinized unconverted and converted high amylose starch at the same jet-cooking temperature.

The confectionary formulation consisted of:

| | wt % | s.s. % | % d.s.b. |
|---|---|---|---|
| 62 DE Corn syrup | 47.8 | 39.0 | 49.9 |
| Sucrose | 30.3 | 30.2 | 38.7 |
| Pregelatinized, non-granular high amylose starch (ahnyd.)* | 2.7 | 2.7 | 3.5 |
| Fluidity corn starch (65 W.F.) | 6.2 | 6.2 | 7.9 |
| Water (to std.) | 13.0 | | |
| | 100.0% | 78.1 | 100.0% |

*11.4% on a dry solids basis of combined starches
s.s. indicates soluble solids
d.s.b. indicates dry solids basis The confectionary dispersion was prepared by dry blending the starches and sugar and adding the blend to a mixture of corn syrup and water at 82° C. (180° F.) with agitation. The candy syrup was jet-cooked at 141° C. (285° F.) and 168° C. (335° F.), the latter being the temperature conventionally used to prepare starch-based jelly gum confectionaries containing high amylose starches. The unique spray-dried high amylose starches (about 70% amylose) used in these blends were pregelatinized using the novel coupled jet-cooking/spray-drying process described herein. For comparison, a 30/70 blend of an ungelatinized high amylose starch (about 70% amylose) and the 65 WF corn starch were used in the confectionary formulation and cooked at the same temperatures. The gel strengths were measured after 24 hours. The results are shown in Table I.

TABLE I

| High Amylose Starches (70% amylose) in 30/70 Blend with 65 W.F. Corn Starch | Jet Cooking Temperature (°F.) | Gel Strength at 24 hours (g/cm²) |
|---|---|---|
| Pregelatinized, non-granular, unconverted high amylose starch | 285 | 202 |
| Pregelatinized, non-granular, converted high amylose starch having a $CaCl_2$ viscosity of about 25 sec. | 285 | 215 |
| Ungelatinized, granular, unconverted high amylose starch (comparative) | 285 | 99 |
| Ungelatinized, granular, converted high amylose starch having a $CaCl_2$ viscosity of about 25 sec. (comparative) | 285 | 91 |
| Pregelatinized, non-granular, unconverted high amylose starch | 335 | 207 |
| Pregelatinized, non-granular, converted high amylose starch | 335 | 212 |
| Ungelatinized, granular unconverted high amylose starch (comparative) | 335 | 205 |

The results show that the blends containing pregelatinized, non-granular, fully dispersed high amylose starches prepared by the coupled jet-cooking/spray-drying process can be jet-cooked at a lower temperature (141° C.-285° F.) and still provide a confectionary with a firm gel strength. The confectionaries containing the ungelatinized, granular high amylose starch were significantly lower in gel strength (91-99 vs. 202-215 g.) when jet-cooked at the same temperature. When jet-cooked at 163° C. (335° F.), the granular unconverted high amylose starch set up to a firm gel which was, however, lower in gel strength than the confectionaries containing the pregelatinized, non-granular, converted high amylose starch cooked at 141° C. (285° F.) (205 vs. 215 g.).

EXAMPLE II

This example shows the use of 30/70 blends of the unique pregelatinized, non-granular, unconverted high amylose starch (about 50% amylose) in the jelly gum confectionary. For comparison a 30/70 blend containing a ungelatinized, granular, unconverted high amylose starch (about 50% amylose) was used in the confectionary. The formulation was the same as in Example I except that the starch was added to a corn syrup and sugar mixture which was at 82° C. (180° F.) and then hot water (100? C.-212° F.) was added. The syrup was jet-cooked at the indicated temperatures. The spray-dried starch was prepared by the coupled jet-cooking/spray-drying process. The results are shown in Table II.

TABLE II

| High Amylose Starches (50% amylose) 30/70 Blend with 65 W.F. Corn Starch | Jet Cooking Temperature (°F.) | Gel Strength after 24 hours (g/cm$^2$) |
|---|---|---|
| Pregelatinized, non-granular, unconverted high amylose starch | 265–275 | 127 |
| Pregelatinized, non-granular, unconverted high amylose starch | 285–300 | 126 |
| Pregelatinized, non-granular, unconverted high amylose starch | 310 | 132 |
| Pregelatinized, non-granular, unconverted high amylose starch | 330–335 | 95 |
| Ungelatinized, granular high amylose starch (comparative) | 265–275 | 70 |
| Ungelatinized, granular high amylose starch (comparative) | 285–300 | 101 |
| Ungelatinized, granular high amylose starch (comparative) | 310 | 115 |
| Ungelatinized, granular high amylose starch (comparative) | 330–335 | 116 |

The results show that the non-granular, fully dispersed high amylose starch pregelatinized by the coupled jet-cooking/spray drying process provides superior gel strengths at lower jet-cooking temperatures. The results also show that the optimum jet-cooking temperature for this pregelatinized, non-granular, unconverted high amylose starch is about 250°–310° F.

EXAMPLE III

This example shows the use of the pregelatinized, non-granular, unconverted high amylose starch (about 70% amylose) prepared by the coupled jet-cooking/spray-drying process in a 30/70 blend with a fluidity corn starch having a W.F. of 75. The confectionary syrup was prepared as in Example II and jet-cooked at 141° C. (285° F.). The 24 hour gel strength was 239 g/cm$^2$. Another run of a blend containing a 65 W.F. fluidity corn starch and a pregelatinized, non-granular, unconverted high amylose starch (70%) provided a confectionary with a gel strength after 24 hours of 245 g/cm$^2$. This shows that a fluidity corn starch with a higher water fluidity can be used.

EXAMPLE IV

This example describes jelly gum confectionaries that were prepared using granular, unconverted high amylose starches pregelatinized by spray-drying using the specially designed nozzles described in U.S. Pat. No. 4,280,851. Confectionaries were also prepared using non-granular starches pregelatinized by the novel coupled jet-cooking/ spray-drying process. The confectionary syrup was prepared as in Example II except that the pregelatinized, non-granular high amylose starch was alkali-washed prior to its inclusion in the starch blend with the 65 WF corn starch. The results are shown in Table III.

TABLE III

| High Amylose Starches in 30/70 Blend with 65 W.F. Corn | Jet Cooking Temperature (°F.) | Gel Strength at 24 hours (g/cm$^2$) |
|---|---|---|
| Pregelatinized, granular, unconverted high amylose starch (70%) spray-dried with nozzle of U.S. Pat. No. 4,280,851 | 300 | 179 |
| Pregelatinized, non-granular, unconverted high amylose starch (70%) spray-dried using coupled jet-cooking/spray-drying process | 300 | 162 |

The results show that the spray-drying method of U.S. Pat. No. 4,280,851 provided a pregelatinized granular starch which could also be used at a lower temperature and still give a good gel strength.

EXAMPLE V

This example shows the use of indirect steam cooking to prepare a jelly gum confectionary. The confectionary formulation was as follows:

|  | wt. % | % S.S. |
|---|---|---|
| 62 DE Corn syrup | 41.3 | 33.6 |
| Sugar | 26.9 | 26.8 |
| Pregelatinized high amylose starch | 2.7 | 2.4 |
| Fluidity corn starch (65 W.F.) | 7.9 | 7.1 |
| Water | 21.2 | 0.0 |
|  | 100.0% | 69.9% |

A non-granular, unconverted high amylose starch (about 70% amylose) pregelatinized by the coupled jet-cooking/spray-drying process and a 65 W.F. corn starch were dry blended, added to a mixture of corn syrup and water preheated to 65° C. (149° F.), blended for 1 minute, and heated to 90° C. (194° F.). The formulation was cooked in a Ter Braak static cooker at 143°–146° C. (290°–295° F.). The solids after cooking were 75%. The formulation was deposited without tailing. It set up significantly faster than a confectionary formulation processed at 169° C. (336° F.) containing granular unconverted high amylose starch (about 70% amylose).

EXAMPLE VI

In this example jelly gum confectionaries were prepared using non-granular, unconverted high amylose starches pregelatinized by fully dispersing the starch by cooking at 320° F. (160° C.) and drum-drying. This process is comparable to that described in U.S. Pat. No. 3,086,890 except that the starch slurry was not autoclaved. Although different cooking equipment was used, the resulting starch cook was identical and the drying method was same.

A high amylose starch (about 70% amylose) was slurried in water at 6% "as is" solids and jet-cooked at 160° C. (320° F.) developing 105–115 psi of back pressure. The cook, 4.8–5.2% anhydrous solids, was held in a vacuum bottle and allowed to cool to 90° C. A double drum-drier having a stainless steel surface at a temperature of 143° C. (289° F.) was set so that the nip gap between the drums was 0.001 in. (0.00254 cm.). The cook was poured into the nip gap between the heated surfaces; retention time on the drum was 68 seconds. The dried product was a thin, white porous, lacy, sheet/flake-like material and was mechanically ground to less than or equal to 150 microns to give a porous, white fluffy, low density powder. Opaque, cuttable, irreversible gels were obtained when the drum-dried starch was redispersed in cold water, and opaque, cuttable, irreversible, resilient gels were obtained when it was dispersed in hot water (194°-203° F. - 90°-95° C.). The confectionary syrup was prepared as in Example II. Confectionaries were also prepared using non-granular starches pregelatinized by the coupled jet-cooking/-spray-drying process. The results are shown in Table IV.

TABLE IV

| High Amylose Starches (70% amylose) in 25/75 Blend with 65 W.F. Corn | Jet Cooking Temperature (F.) | Gel Strength after 24 Hrs (g/cm²) |
|---|---|---|
| Pregelatinized, non-granular, unconverted high amylose starch (autoclaved and drum-dried) | 285 | 123 |
| Pregelatinized, non-granular, unconverted high amylose starch (spray-dried using continuous coupled jet-cooking/spray- drying process) | 285 | 206 |
| Ungelatinized, granular, unconverted high amylose starch (comparative)* | 285 | 99 |

*30/70 Blend

This example shows that the pregelatinized, non-granular starch prepared by spray-drying is preferred but that the pregelatinized, non-granular starch prepared by drum-drying gives a firm gel which is acceptable for some confectionaries.

EXAMPLE VII

This example shows the use of the pregelatinized, non-granular, unconverted high amylose starch (about 70% amylose) prepared by the coupled jet-cooking/-spray-drying process in a kettle-cooked confectionary formulation.

The confectionary formulation consisted of:

| | wt. % | % s.s | % d.s.b. |
|---|---|---|---|
| 62 DE Corn syrup | 31.6 | 25.8 | 51.6 |
| Sugar | 20.0 | 20.0 | 40.0 |
| Pregelatinized high amylose starch (ahnyd) | 4.2 | 4.2 | 8.4 |
| Water (to Std.) | 44.2 | 0.0 | 0.0 |
| | 100.0 | 50.0 | 100.0 |

The confectionary dispersion was prepared as in Example I. The dry blend of starch and sugar was added to boiling water with agitation and boiled for 10 min. with moderate agitation. The hot corn syrup (82° C.-180° F.) was then added. The mixture was boiled to 76% soluble solids (s.s.). The 24 hour gel strength was 361 g/cm². A confectionary prepared with a granular high amylose starch (about 70%) cooked to 76% soluble solids had a gel strength of only 10 g cm². This shows how unique the pregelatinized, non-granular starch prepared be the continuous coupled process is because it now produces a very firm gel at an atmospheric cook temperature.

EXAMPLE VIII

This example shows the use of starch blends (30/70) in a batch process. The confectionary formulation was as follows:

| | % | % ss | % dsb |
|---|---|---|---|
| 62 DE Corn syrup | 31.0 | 25.3 | 49.8 |
| Sugar | 19.7 | 19.6 | 38.7 |
| Pregelatinized high amylose starch (ahnyd.) | 1.8 | 1.8 | 3.6 |
| Fluidity corn starch (65 W.F.) (ahnyd.) | 4.0 | 4.0 | 7.9 |
| Water (to std.) | 13.0 | — | — |
| | 100.0 | 50.7 | 100.0 |

The starches were dry blended and added to water at 100° C. (212° F.), cooked to disperse the starch, the sugar and corn syrup were then added, and the mixture was boiled to 76% soluble solids. For comparison 30/70 blends containing ungelatinized, granular, unconverted high amylose starches (about 00 and 70%) were used in the confectionary formulation, as well as 100% of the fluidity corn starch (65 WF). The results are shown in Table V.

TABLE V

| Starches | Gel Strength 24 hours (g/cm²) |
|---|---|
| Pregelatinized, non-granular high amylose starch (about 70% amylose) (prepared by continuous coupled jet-cooking/spray-drying process) in 30/70 blend with 65 W.F. corn starch | 227 |
| Pregelatinized, non-granular high amylose starch (about 50% amylose) (prepared by continuous coupled jet-cooking/spray-drying process) in 30/70 blend with 65 W.F. corn starch | 157 |
| Ungelatinized, granular, unconverted high amylose starch (about 70% amylose) in 30/70 blend with 65 W.F. corn starch (comparative) | 26 |
| Ungelatinized, granular, unconverted high amylose starch (about 50% amylose) in 30/70 blend with 65 W.F. Corn starch (comparative) | 36 |
| 65 W.F. Corn starch (comparative) | 47 |

The results show that the pregelatinized starches prepared by the coupled jet-cooking/spray-drying process are unique in that a firm gel is provided at the batch cooking temperature of 104° C. (220° F.), whereas the corresponding ungelatinized base cooked in a confectionary at a similar temperature does not. It also provides a significantly firmer gel than the fluidity corn starch.

EXAMPLE IX

This example shows the use of a one part pregelatinized starch blend. The starches were blended together and then pregelatinized using the coupled jet-cooking spray-drying process described previously. In most of the other Examples and in the other combinations in this Example, only the high amylose starch was pregelatinized prior to inclusion in the confectionary formulation. The confectionary syrup was prepared as in Example II. For comparison, various two piece starch blends (where the fluidity corn starch was not precooked) were prepared. The results are shown in Table VI.

TABLE VI

| High Amylose Starches (70% amylose) and 65 W.F Corn 25/75 | Jet Cooking Temperature (F.) | Gel Strength after 24 Hrs (g/cm²) |
|---|---|---|
| Pregelatinized, non-granular, converted high amylose starch (CaCl₂ viscosity of about 16 sec.) jet-cooked and spray-dried with the 65 W.F. corn starch using the coupled process (one part) | 295–300 | 138 |
| Pregelatinized, non-granular, unconverted high amylose starch jet-cooked and spray-dried using the coupled process and uncooked 65 W.F. corn starch (two part) | 295–300° | 141 |
| Pregelatinized, non-granular, converted high amylose starch (CaCl₂ viscosity of about 25 sec.) jet-cooked and spray-dried using the coupled process and uncooked 65 W.F. corn starch (two part) | 295–300° | 128 |
| Pregelatinized, non-granular, converted high amylose starch (CaCl₂ viscosity of about 16 sec.) jet-cooked and spray-dried using the coupled process and uncooked 65 W.F. corn starch (two part) | 295–300° | 104 |

The results show that a one part system (i.e., a pregelatinized non-granular high amylose starch and a fluidity corn starch co-processed) yielded approximately the same gel strength as a two part system (i.e., a post-blend of a pregelatinized non-granular high amylose starch and a regular uncooked fluidity cornstarch) when all candy slurries were continuously processed at the significantly lower jet-cooking temperature of 295°–300° F.

EXAMPLE X

This example compares the gel strength of confectionary formulations prepared using ungelatinized starches typically recommended for and/or used in confectionary formulations. The starches and cooking temperatures used are shown in Table VII. The confectionary was prepared as in Example II.

TABLE VII

| High Amylose Starches in 25/75 or 30/70 Blend with 65 W.F. Corn | Jet Cooking Temperature (°F.) | Gel Strength after 24 Hrs (g/cm²) |
|---|---|---|
| Pregelatinized, non-granular, unconverted high amylose starch (70% amylose) prepared by coupled jet-cooking/spray-drying process in 25/75 blend | 295–300 | 140 |
| Pregelatinized, non-granular, converted high amylose starch (70% amylose) having a CaCl₂ viscosity of about 25 sec. prepared by coupled jet-cooking/spray-drying process in 25/75 blend | 295–300 | 139 |
| Converted high amylose starch (50% amylose) in 30/70 blend (comparative) | 325–335 | 140 |
| Stabilized high amylose starch (50% amylose) in 30/70 blend (comparative) | 315 | 36 |
| Unconverted high amylose starch (70% amylose) in 25/75 blend (comparative) | 325–335 | 138 |

The results show that the pregelatinized, non-granular high amylose starches prepared by the coupled process are unique in that they provide a firm gel at a significantly lower cooking temperature than commercially used ungelatinized granular starches cooked at their recommended temperatures cooking When chemical stabilization is used as a means to weaken granular integrity and lower the gelatinization temperature and thus permit a reduction in jet-cooking temperature from 335° to 315°, a significant reduction in gel strength resulted (i.e., from 139–140 to 36 g/cm²).

The jet-cooking temperatures used to process the pregelatinized non-granular high amylose starches (295°–300° F.) were significantly lower than those used to process the non-pregelatinized high amylose starches (335° F.) and yet they provided a gel of equivalent strength (139–140 vs. 138–140 g/cm²).

In summary, a process for preparing jelly gum confectionary at a significantly lower temperature is provided The use of pregelatinized, granular or non-granular high amylose starches results in a syrup with an acceptably low hot flow viscosity and a gel with a high gel strength.

Now that the preferred embodiments of the present invention have been described in detail, various modifications and improvements thereon will become readily apparent to those skilled in the art. Accordingly, the spirit and scope of the invention are to be limited only by the appended claims, and not by the foregoing specification.

What is claimed:

1. A process for the manufacture of a jelly gum confectionary by casting, which comprises the steps of:
   (a) preparing a dispersion of about 1 to 15%, on a dry solids basis, of a pregelatinized high amylose starch having an amylose content of at least about 40% amylose or a combination thereof with up to about 9 parts of a converted starch other than a high amylose starch, about 80–95% of a sweetener, and sufficient water, the percentages being by weight and totaling 100%; wherein the pregelatinized high amylose starch is selected from the group consisting of an unconverted starch, a converted starch, and mixtures thereof and wherein the pregelatinized unconverted or converted high amylose starch is selected from the group consisting of (i) a spray-dried uniformly gelatinized granular starch in the form of indented spheres, with at least a majority of the granules being whole and unbroken, the starch granules being in the form of loosely-bound agglomerates or individual granules, (ii) a spray-dried, non-granular starch, characterized in that the starch is substantially non-crystalline, substantially non-retrograded, and fully pre-dispersed, (iii) a drum-dried fully dispersed, non-granular starch which is a porous, fluffy powder, and (iv) mixtures thereof;

(b) continuously cooking the dispersion at at least 107° C. (225° F.) and less than 166° C. (330° F.) in a jet-cooker for a time sufficient to fully solubilize the starch or starches; and (c) casting the cooked dispersion.

2. A process for the manufacture of a jelly gum confectionary by casting, which comprises the steps of:

(a) preparing a dispersion of about 1 to 15%, on a dry solids basis, of a pregelatinized high amylose starch having an amylose content of at least about 40% amylose or a combination thereof with up to about 9 parts of a converted starch other than a high amylose starch, about 80–95% of a sweetener, and sufficient water, the percentages being by weight and totaling 100%, wherein the pregelatinized high amylose starch is selected from the group consisting of an unconverted starch, a converted starch, and mixtures thereof and wherein the pregelatinized unconverted or converted high amylose starch is selected from the group consisting of (i) a spray-dried uniformly gelatinized granular starch in the form of indented spheres, with at least a majority of the granules being whole and unbroken, the starch granules being in the form of loosely-bound agglomerates or individual granules, (ii) a spray-dried, non-granular starch, characterized in that the starch is substantially non-crystalline, substantially non-retrograded, and fully pre-dispersed, (iii) a drum-dried fully dispersed, non-granular starch which is a porous, fluffy powder, and (iv) mixtures thereof;

(b) continuously cooking the dispersion in an indirect cooker at at least 121° C. (250° F.) and less than 154° C. (310° F.); and (c) casting the cooked dispersion.

3. A process for the manufacture of a jelly gum confectionary by casting, which comprises the steps of:

(a) preparing a dispersion of about 1 to 15%, on a dry solids basis, of a pregelatinized high amylose starch having an amylose content of at least about 40% amylose or a combination thereof with up to about 9 parts of a converted starch other than a high amylose starch, about 80–95% of a sweetener, and sufficient water the percentages being by weight and totaling 100%, wherein the pregelatinized high amylose starch is selected from the group consisting of an unconverted starch, a converted starch, and mixtures thereof and wherein the pregelatinized unconverted or converted high amylose starch is selected from the group consisting of (i) a spray-dried uniformly gelatinized granular starch in the form of indented spheres, with at least a majority of the granules being whole and unbroken, the starch granules being in the form of loosely-bound agglomerates or individual granules, (ii) a spray-dried, non-granular starch, characterized in that the starch is substantially non-crystalline, substantially non-retrograded, and fully pre-dispersed, (iii) a drum-dried fully dispersed, non-granular starch which is a porous, fluffy powder, and (iv) mixtures thereof;

(b) cooking the dispersion in a kettle at atmospheric pressure and at at least 71° C. (160° F.) and up to the boiling point of the dispersion; and (c) casting the cooked dispersion.

4. The process of claim 1, 2 or 3, wherein the converted starch other than the high amylose starch is selected from the group consisting of an ungelatinized granular starch, a pregelatinized granular starch, and a pregelatinized non-granular starch.

5. The process of claim 1, 2 or 3, wherein the high amylose starch has an amylose content of about 50–70%, wherein the high amylose starch is used in combination with the converted starch, wherein the converted starch other than the high amylose starch is selected from the group consisting of an ungelatinized granular starch, a pregelatinized granular starch, and a pregelatinized non-granular starch, and wherein the converted starch is corn, sorghum, rice, potato, or wheat.

6. The process of claim 5, wherein the combination comprises about 20–40% of the pregelatinized high amylose starch and about 60–80% of the converted corn starch, the converted corn starch having a water fluidity of about 40–80.

7. The process of claim 2 or 3, wherein the confectionary further comprises about 0–20% of a confectionary ingredient selected from the group consisting of a flavorant, colorant, fat, oil, surfactant, humectant, vitamin, preservative and mixtures thereof.

8. The process of claim 7, wherein the confectionary ingredient is a flavorant present on a dry substance basis in an amount of from 1–20% of the confectionary composition and comprises a fruit employed in dehydrated form.

9. The process of claim 2 or 3, wherein the mixture of (a) contains the pregelatinized starch or starch combination, sweetener, and water in proportions to provide 72–80% soluble solids.

10. The process of claim 1, 2, or 3, wherein the pregelatinized high amylose starch has an amylose content of about 50–70% and is the spray-dried uniformly gelatinized granular starch in the form of the indented spheres, with at least a majority of the granules being whole and unbroken, the starch granules being in the form of loosely-bound agglomerates or individual granules.

11. The process of claim 1, 2, or 3, wherein the pregelatinized high amylose starch has an amylose content of about 50–70% and is the spray-dried, non-granular starch, characterized in that the starch is substantially non-crystalline, substantially non-retrograded, and fully dispersed.

12. The process of claim 1, 2, or 3, further comprising the step of reducing the solids of the cooked dispersion of step (b) to about 72–84% soluble solids by cooking at the boiling point of the dispersion prior to casting the dispersion in step (c).

13. The process of claim 2, wherein the indirect cooker is an indirect steam cooker or a tubular heat exchanger.

14. The process of claim 1, wherein the dispersion of step (b) is cooked at 154° C. (310° F.) or less.

15. The process of claim 1, wherein the dispersion of step (b) is cooked at 129° C. (265° F.) to 149° C. (300° F.).

16. The process of claim 1, wherein the dispersion is cooked at 141° C. (285° F.) to 146° C. (295° F.).

17. The process of claim 2, wherein the dispersion of step (b) is cooked at 146° C. (295° F.) or less.

18. The process of claim 2, wherein the dispersion of step (b) is cooked at 143° C. (290° F.) to 146° C. (295° F.).

19. The process of claim 3, wherein the dispersion of step (b) is cooked at 104° C. (220° F.) or less.

* * * * *

UNITED STATES PATENT AND TRADEMARK OFFICE
CERTIFICATE OF CORRECTION

PATENT NO. : 4,874,628

DATED : October 17, 1989

INVENTOR(S) : Eden et al.

It is certified that error appears in the above-identified patent and that said Letters Patent is hereby corrected as shown below:

Col. 18,
in Claim 7, at line 1, that portion of the claim reading "claim 2 or 3" should read -- claim 1, 2, or 3 --
Col. 18,
in Claim 9, at line 1, that portion of the claim reading "claim 2 or 3" should read -- claim 1, 2, or 3 --

Signed and Sealed this

Fifth Day of October, 1993

*Attest:*

BRUCE LEHMAN

*Attesting Officer*  Commissioner of Patents and Trademarks